US012596831B1

(12) United States Patent

Peleg et al.

(10) Patent No.: US 12,596,831 B1

(45) Date of Patent: Apr. 7, 2026

(54) SECURE MAINFRAME ACCESS FOR AI AGENTS

(71) Applicant: Geniez AI Inc., Dover, DE (US)

(72) Inventors: Gil Peleg, Wokingham (GB); Hanan Milman, Rishon le Ziyon (IL)

(73) Assignee: Geniez AI Inc., Dover, DE (US)

( * ) Notice: Subject to any disclaimer, the term of this patent is extended or adjusted under 35 U.S.C. 154(b) by 0 days.

(21) Appl. No.: 19/388,609

(22) Filed: Nov. 13, 2025

(51) Int. Cl.
 *H04L 29/06* (2006.01)
 *G06F 21/31* (2013.01)
 *G06F 21/62* (2013.01)

(52) U.S. Cl.
 CPC .......... *G06F 21/6218* (2013.01); *G06F 21/31* (2013.01)

(58) Field of Classification Search
 CPC .............................. G06F 21/6218; G06F 21/31
 See application file for complete search history.

(56) References Cited

U.S. PATENT DOCUMENTS

| | | | |
|---|---|---|---|
| 12,489,771 B1* | 12/2025 | Erlingsson ............. | G06F 9/5072 |
| 2020/0344067 A1* | 10/2020 | Fradkin .............. | H04L 67/1097 |
| 2022/0335125 A1* | 10/2022 | Goodridge ........... | G06F 21/554 |

* cited by examiner

*Primary Examiner* — Wasika Nipa

(74) *Attorney, Agent, or Firm* — Myers Wolin, LLC

(57) ABSTRACT

A method, system and computer program product, the method comprising: receiving, by an intermediate agent, from an AI client, a request for data or actions from a mainframe system (MF), the request comprising a previously generated token associated with a user identifier (uID) of the MF and with a set of privileges within the MF; providing by the intermediate agent the request to an MF agent executed by the MF, wherein the MF agent has a privilege to spawn an MF process associated with the uID, wherein the MF agent is restricted from accessing data or performing actions other than spawning the MF process; and spawning, by the MF agent, the MF process executed by the MF, wherein the MF process has the set of privileges associated with the uID, wherein the MF process is restricted from spawning another process, thereby implementing secure access to the MF.

15 Claims, 5 Drawing Sheets

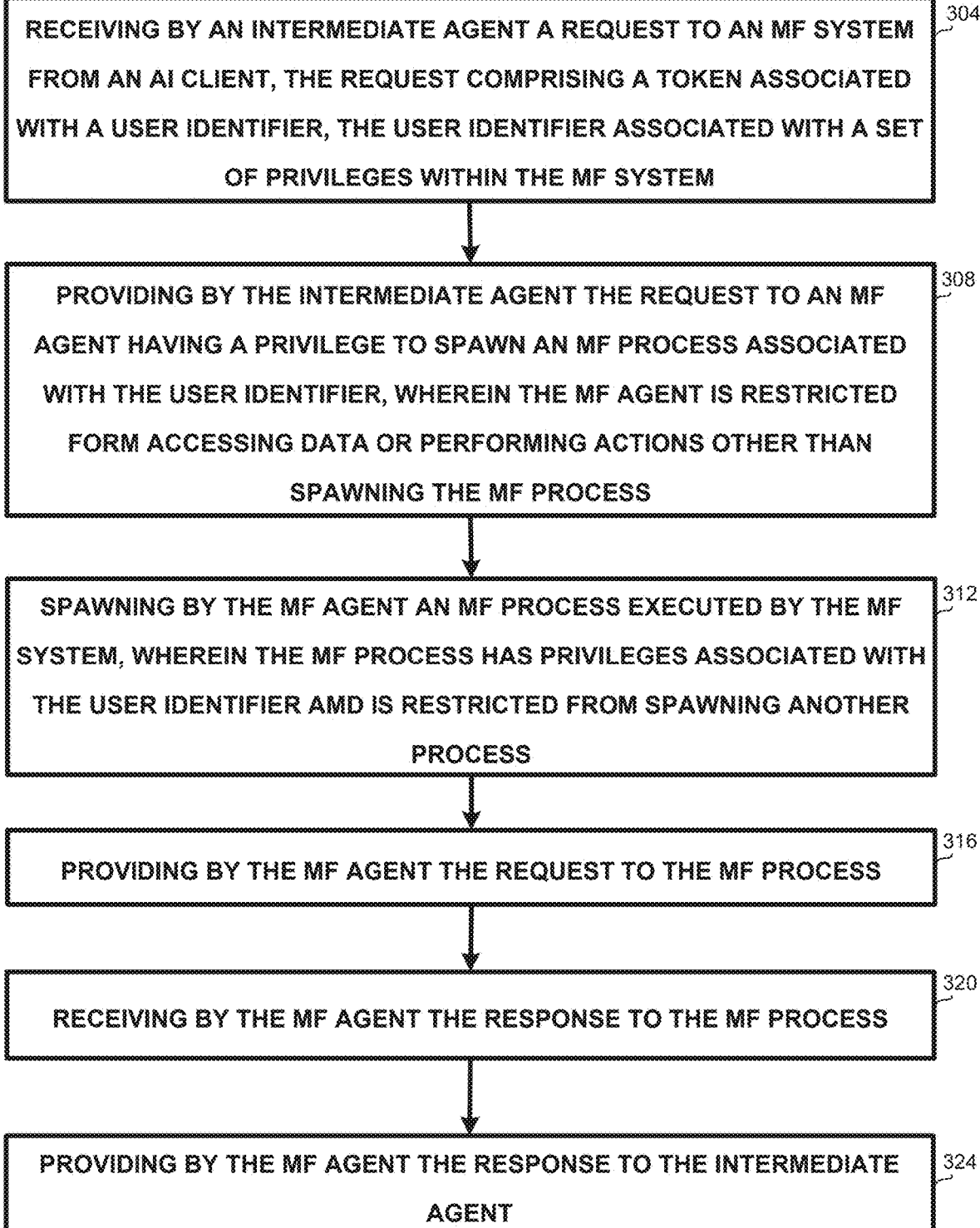

RECEIVING BY AN INTERMEDIATE AGENT A REQUEST TO AN MF SYSTEM FROM AN AI CLIENT, THE REQUEST COMPRISING A TOKEN ASSOCIATED WITH A USER IDENTIFIER, THE USER IDENTIFIER ASSOCIATED WITH A SET OF PRIVILEGES WITHIN THE MF SYSTEM — 304

PROVIDING BY THE INTERMEDIATE AGENT THE REQUEST TO AN MF AGENT HAVING A PRIVILEGE TO SPAWN AN MF PROCESS ASSOCIATED WITH THE USER IDENTIFIER, WHEREIN THE MF AGENT IS RESTRICTED FORM ACCESSING DATA OR PERFORMING ACTIONS OTHER THAN SPAWNING THE MF PROCESS — 308

SPAWNING BY THE MF AGENT AN MF PROCESS EXECUTED BY THE MF SYSTEM, WHEREIN THE MF PROCESS HAS PRIVILEGES ASSOCIATED WITH THE USER IDENTIFIER AMD IS RESTRICTED FROM SPAWNING ANOTHER PROCESS — 312

PROVIDING BY THE MF AGENT THE REQUEST TO THE MF PROCESS — 316

RECEIVING BY THE MF AGENT THE RESPONSE TO THE MF PROCESS — 320

PROVIDING BY THE MF AGENT THE RESPONSE TO THE INTERMEDIATE AGENT — 324

FIG. 3A

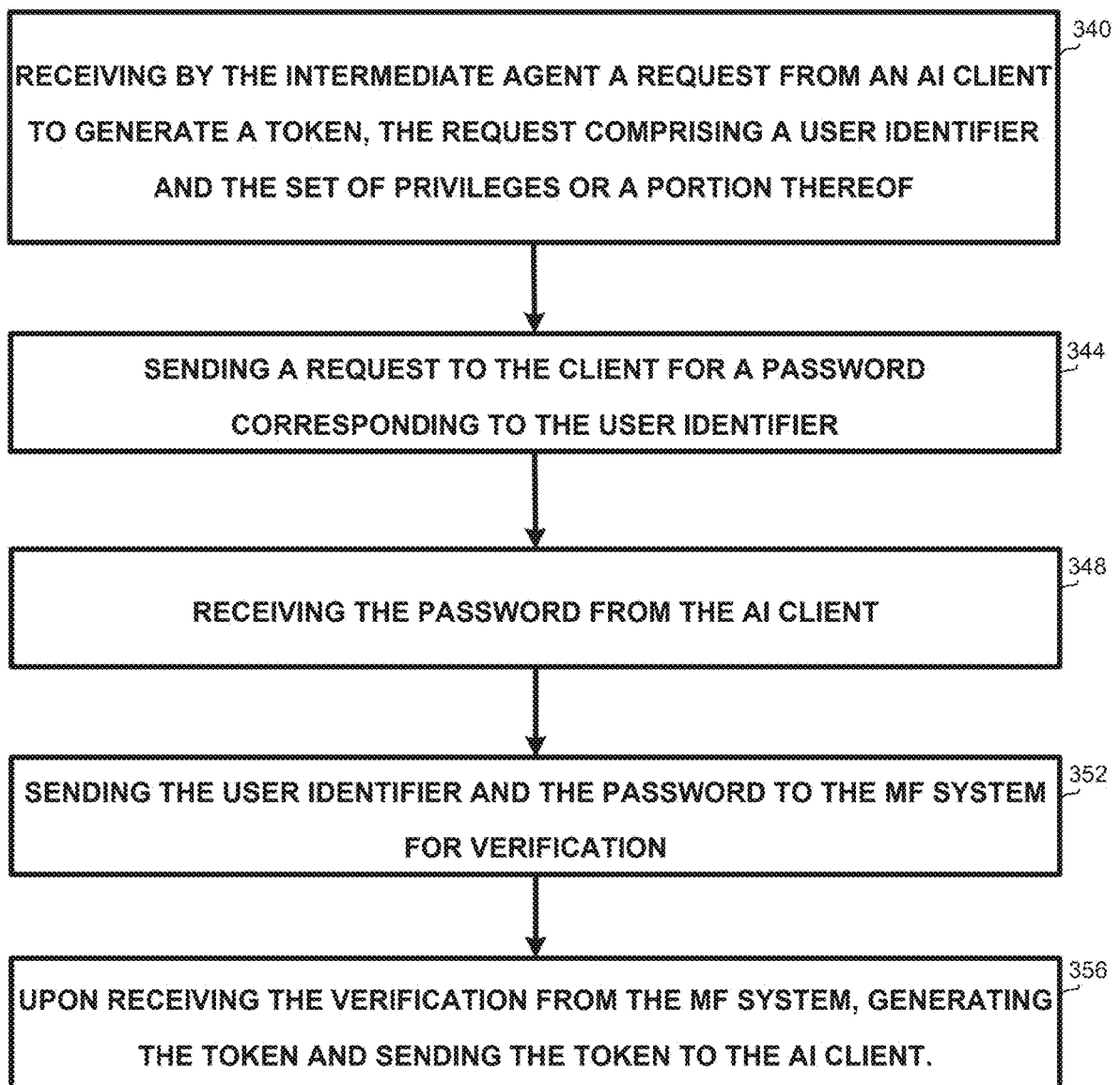

RECEIVING BY THE INTERMEDIATE AGENT A REQUEST FROM AN AI CLIENT TO GENERATE A TOKEN, THE REQUEST COMPRISING A USER IDENTIFIER AND THE SET OF PRIVILEGES OR A PORTION THEREOF ⌐340

SENDING A REQUEST TO THE CLIENT FOR A PASSWORD CORRESPONDING TO THE USER IDENTIFIER ⌐344

RECEIVING THE PASSWORD FROM THE AI CLIENT ⌐348

SENDING THE USER IDENTIFIER AND THE PASSWORD TO THE MF SYSTEM FOR VERIFICATION ⌐352

UPON RECEIVING THE VERIFICATION FROM THE MF SYSTEM, GENERATING THE TOKEN AND SENDING THE TOKEN TO THE AI CLIENT. ⌐356

FIG. 3B

SECURE MAINFRAME ACCESS FOR AI AGENTS

TECHNICAL FIELD

The present disclosure relates to accessing mainframe computers in general, and to a system and method for enabling external applications to access mainframe computers securely, in particular.

BACKGROUND

Historically, and continuing well into the present day, large organizations such as government agencies, financial institutions, insurance companies, and other major corporations have relied on mainframe (MF) computers as their primary systems of record. These systems serve as the backbone for managing and processing vast amounts of business-critical data, supporting essential operations such as transactions, record-keeping, and customer information management. Mainframes are renowned for their stability, reliability, and ability to handle high volumes of data, which that have made them indispensable for mission-critical environments over many decades.

However, despite their robustness, MF systems face growing challenges in today's rapidly evolving technological landscape. Modern users, whether organization employees, partners or customers, expect advanced digital experiences which provide interactivity, real-time data access, intuitive interfaces, and the ability to respond to changing needs.

In addition, MF systems face a growing human resource challenge, since the number of skilled programmers, system architects, and maintenance specialists proficient in mainframe technologies is in constant decline. This shortage of expertise limits the ability to introduce new features and adapt to evolving business needs, or integrate mainframes with newer digital platforms.

At the same time, the digital ecosystem has become increasingly dangerous, with cyber threats, including viruses, ransomware and sophisticated hacking and data-breach attempts, continuously targeting computing platforms, the information stored therein, and even the data owners and users.

BRIEF SUMMARY

One exemplary embodiment of the disclosed subject matter is a computer-implemented method for securing access to mainframe (MF) data from an Artificial Intelligence (AI) client, the method comprising: receiving, by an intermediate agent, from the AI client, a request for data or actions from a mainframe (MF) system, the request comprising a token, the token was previously generated, the token is associated with a user identifier (uID) of the MF system, wherein the uID is associated with a set of privileges within the MF system; providing by the intermediate agent the request to an MF agent executed by the MF system, wherein the MF agent has a privilege to spawn an MF process associated with the uID, wherein the MF agent is restricted from accessing data or performing actions other than spawning the MF process; and spawning, by the MF agent, the MF process, the MF process is executed by the MF system, wherein the MF process has the set of privileges that is associated with the uID, wherein the MF process is restricted from spawning another process, thereby implementing secure access to the MF system. Within the method, the token is optionally being generated by: receiving by the intermediate agent from a client a request to generate the token for accessing the MF system, the request comprising the uID of the MF system and the set of privileges or a portion thereof, sending by the intermediate agent a request to the AI client for a password associated with the uID of the MF system; receiving by the intermediate agent the password from the AI client; sending the by the intermediate agent uID and the password to the MF system for verification; and subject to receiving by the intermediate agent from the MF system a verification that the password corresponds to the uID, generating the token. The method can further comprise: providing by the MF agent the request to the MF process; receiving by the MF agent a response to the request; and providing by the MF agent the response to the intermediate agent. Within the method, the intermediate agent is optionally configured to receive the request through a generative Artificial Intelligence (genAI) protocol. Within the method, the genAI protocol is optionally Model Context Protocol (MCP). Within the method, the AI client is optionally implemented using a Large Language Model (LLM).

Another exemplary embodiment of the disclosed subject matter is a system for securing access to MF data from an LLM or an AI client, the system comprising: an intermediate agent configured to: receive from the AI client, a request for data or actions from an MF system, the request comprising a token, the token was previously generated, the token is associated with a uID of the MF system, wherein the uID is associated with a set of privileges within the MF system; and provide the request to an MF agent executed by the MF system, wherein the MF agent has a privilege to spawn an MF process associated with the uID, wherein the MF agent is restricted from accessing data or performing actions other than spawning the MF process; and an MF agent configured to: upon receiving the request from the intermediate agent, spawning an MF process, the MF process is executed by the MF system, wherein the MF process has the set of privileges that is associated with the uID, wherein the MF process is restricted from spawning another process, thereby implementing secure access to the MF system. Within the system, the intermediate agent is optionally further configured to: receive from a client a request to generate the token for accessing the MF system, the request comprising the uID of the MF system and the set of privileges or a portion thereof, send a request to the AI client for a password associated with the uID of the MF system; receive the password from the AI client; send the uID and the password to the MF system for verification; and generate the token subject to receiving from the MF system a verification that the password corresponds to the uID. Within the system, the MF agent is optionally further configured to: provide the request to the MF process; receive a response to the request; and provide the response to the intermediate agent. Within the system, the intermediate agent is optionally further configured to receive the request through a genAI protocol. Within the system, the genAI protocol is optionally MCP. Within the system, the AI client is optionally implemented using an LLM.

Yet another exemplary embodiment of the disclosed subject matter is a computer program product comprising a computer readable storage medium retaining program instructions for securing access to MF data from an LLM or an AI client, the program instructions comprise: receiving, by an intermediate agent, from an AI client, a request for data or actions from an MF system, the request comprising a token, the token was previously generated, the token is associated with a uID of the MF system, wherein the uID is associated with a set of privileges within the MF system;

providing by the intermediate agent the request to an MF agent executed by the MF system, wherein the MF agent has a privilege to spawn an MF process associated with the uID, wherein the MF agent is restricted from accessing data or performing actions other than spawning the MF process; and spawning, by the MF agent, the MF process, the MF process is executed by the MF system, wherein the MF process has the set of privileges that is associated with the uID, wherein the MF process is restricted from spawning another process, thereby implementing secure access to the MF system. Within the product, the token is optionally being generated by: receiving by the intermediate agent from a client a request to generate the token for accessing the MF system, the request comprising the uID of the MF system and the set of privileges or a portion thereof, sending by the interme- diate agent a request to the AI client for a password associated with the uID of the MF system; receiving by the intermediate agent the password from the AI client; sending the by the intermediate agent uID and the password to the MF system for verification; and subject to receiving by the intermediate agent from the MF system a verification that the password corresponds to the uID, generating the token. Within the computer program product, the program instruc- tions can further comprise: providing by the MF agent the request to the MF process; receiving by the MF agent a response to the request; and providing by the MF agent the response to the intermediate agent. Within the computer program product, the intermediate agent is optionally con- figured to receive the request through a genAI protocol. Within the computer program product, the genAI protocol is optionally MCP. Within the computer program product, the AI client is optionally implemented using an LLM.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate cor- responding or like components. Unless indicated otherwise, the drawings provide exemplary embodiments or aspects of the disclosure and do not limit the scope of the disclosure. In the drawings:

FIG. 3A is a flowchart of a method for connecting AI agents to mainframe data, in accordance with some exem- plary embodiments of the disclosure;

FIG. 3B is a flowchart of a method for generating a token, in accordance with some exemplary embodiments of the disclosure;

DETAILED DESCRIPTION

Figures 1, 2:
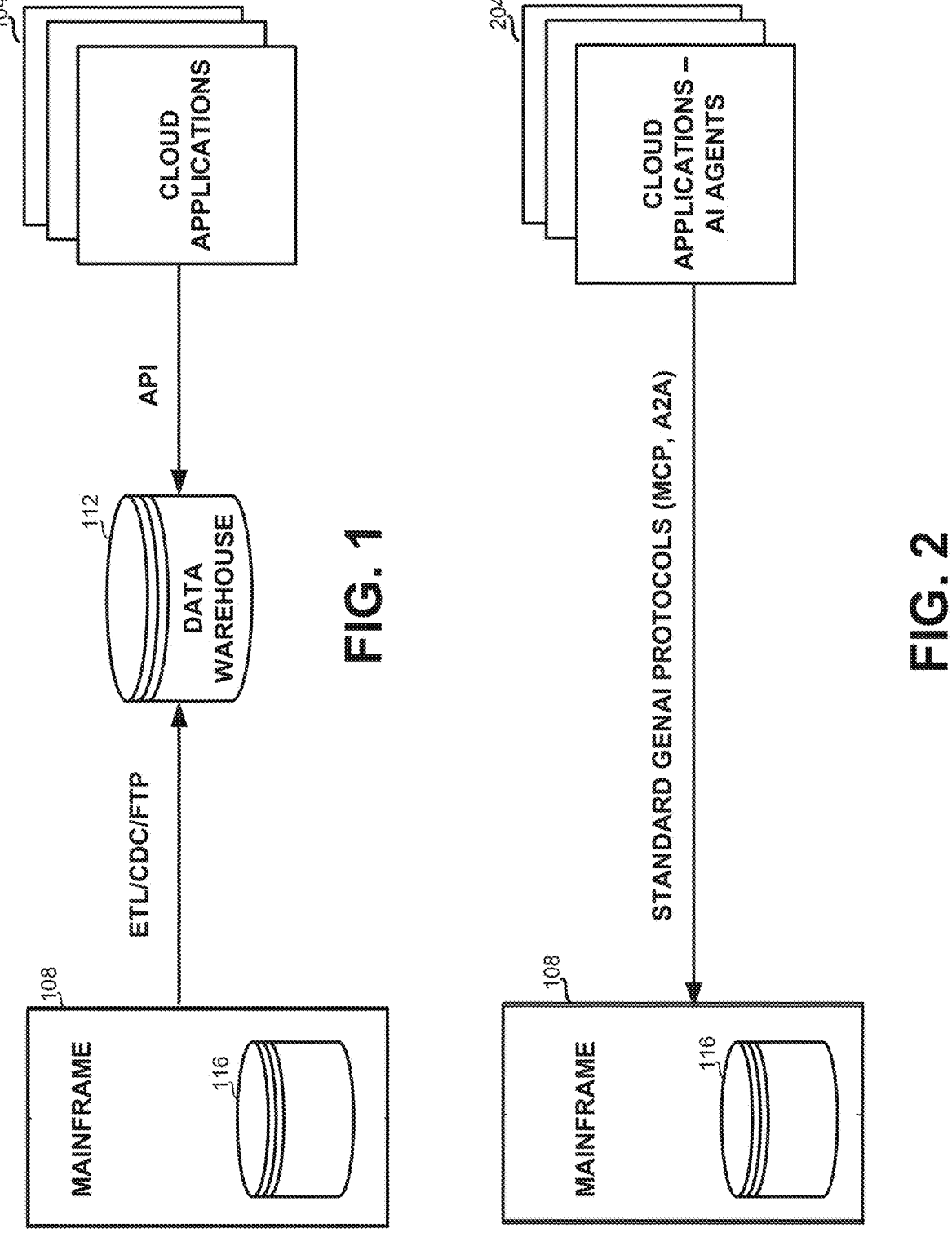
FIG. 1 is a schematic illustration of a traditional system for retrieving data from a database.
FIG. 2 is schematic illustration of a system for retrieving data from a database, in accordance with some exemplary embodiments of the disclosure

Mainframe (MF) systems have been in continuous opera- tion since the early days of computing and remain in use today across a wide range of organizations. These systems have long served as the core infrastructure for processing transactions, managing records, and storing critical business data. Their reliability, stability, and high-volume processing has made them critical to mission-critical operations.

Despite their proven dependability, MF systems exhibit several significant drawbacks, particularly in light of mod- ern technological needs and user expectations.

One such drawback is the restricted accessibility of the data stored within MF systems. Typically, users cannot access MF data directly. Instead, they have to rely on intermediate platforms or databases, referred to as data warehouses, that maintain copies of the original data, and usually only portions thereof. These copies are often updated periodically rather than in real time, sometimes lagging by minutes, hours, or even days, resulting in users receiving outdated or incomplete information. Additionally, creating and maintaining the data warehouses and adding data thereto requires significant time, hardware cost, labor and comput- ing resources.

Another significant drawback lies in the limited scalabil- ity of MF systems. As the number of users and the volume of data continue to grow, these systems struggle to efficiently accommodate increasing computational demands. Scaling up often requires substantial investment in hardware and software, which organizations understandably prefer to invest in production compute, including running business transactions, rather than moving data around for less critical systems.

A further limitation involves flexibility. Traditional main- frame infrastructures were designed to support predefined business processes, query types, and data structures. Con- sequently, adapting them to new requirements, such as handling dynamic data formats, supporting new forms or queries, or integrating with modern digital services, typi- cally demands extensive programming, customization, and testing. These efforts are further complicated by the ongoing shortage of skilled mainframe programmers and other per- sonnel, making system enhancement time-consuming and costly.

Yet another drawback relates to the interface of MF systems. Historically, these systems have provided access through fixed, predefined Application Programming Inter- faces (APIs). In contrast, today's users expect more intuitive and interactive interfaces, including access through modern web or mobile platforms, as well as natural-language-based interaction. Traditional mainframes lack native support for such capabilities, limiting their ability to meet current expectations for seamless, intelligent, and user-friendly data access.

Thus, one technical problem of the disclosure relates to the need to enable users to access MF systems in accordance with modern methodologies rather than through the pre- defined APIs.

Therefore, it is required that users can access the MF systems directly, without having to rely on outdated copies, thereby also saving the need to maintain such copies. In addition users need to be able to communicate with the MF systems in free natural language, and according to their changing needs.

Such access may also eliminate the need for complex and time consuming programming, as programming can be done significantly more easily using modern programming lan- guages and environments on the requesting side.

Another technical problem of the disclosure relates to the scalability of the services provided by the MF systems. Since organizations continue to maintain their data using MF systems, it is required that the services be provided in a timely manner despite the growing volume of requirements, and that additional software can be added at timeframes that are acceptable in today's conditions. For example, if an organization is required to provide certain information in a new format, it may be unacceptable to wait a few months or even a few weeks for a programmer to provide such feature.

Yet another technical problem of the disclosure relates to security issues. Since a large part of the queries and other accesses to computing platforms are through the Internet, it is required to ensure the MF system and the data stored therein are secured against hacking, malware, viruses, and other security threats which occur frequently in Internet-based systems.

One technical solution of the disclosure relates to enabling applications, and in particular web applications and/or Artificial Intelligence (AI) applications to access MF systems using standard protocols, and to receive data or perform actions, while maintaining the security of the data and the MF system.

The solution comprises an intermediate agent executed by a computing platform other than the MF, such as a cloud server, and accessed by clients. Although the disclosure below relates to AI clients, it is understood that the disclosure is not limited and is equally applicable to other clients. The AI clients may issue requests to the intermediate agent, each request associated with a user identifier (uID), wherein the uID is associated with a user having sufficient privileges to access the required data. The intermediate agent may then access an MF agent executed by the MF system, said access comprising sending the uID.

The MF agent may have no privilege to access data of the MF system or perform any other action with the MF system, excluding a privilege to spawn an MF process on behalf of the user associated with the uID. The MF process, since it is associated with the uID, subject to the user having the required privileges, may access the data required for responding to the query, but may have nor a privilege to spawn another process neither other privileges.

The spawned MF process, having the privileges of the uID, is thus under the security supervision of the MF system, and is therefore as secure as any other process therein.

Thus, the MF system may execute two processes: the MF agent having only the administrative privilege to spawn another process and no applicative privileges, and the MF process having only the applicative actionable privilege to access the data or perform actions, but no administrative privilege to spawn yet another process.

This process separation significantly limits the exposure to security threats, as the only entity that accesses the MF database is the MF process, from within the MF system. Thus, this scheme provides security that is as strict as the MF system applies towards any other process.

In order to verify the user issuing a request, the MF agent spawning the MF process may receive a token from the intermediate agent, wherein the token was provided to the intermediate agent by the client. The token may be pre-generated by the intermediate action, as described below.

Thus, upon receiving a request from a client, the intermediate agent may verify the integrity of the provided token and its association with the user. Upon verification, the intermediate agent may send the request to the MF agent, which may in turn spawn an MF process for executing the request.

Once the MF process completed the task and a response is available, the MF process may send the response back to the intermediate agent.

Another technical solution relates to generating the token, such that the token may be used for verifying the required action on behalf of the user.

The token may be pre-generated, by the MF system. The token generation may be initiated by a client sending to the intermediate agent a request for a token, the request comprising a uID. The intermediate agent may request the client to send the password corresponding to the account of the user associated with the uID within the MF system.

The intermediate agent may then send to the MF system, the uID and the password.

The MF system may confirm to the intermediate agent that the password is indeed associated with the uID. Upon receiving the confirmation, the intermediate agent may generate a unique token and provide it to the client for future use. The token may or may not have the uID embedded therein.

Thus, when the intermediate agent receives the request for data/action from the client, it may verify the integrity of the token and its association with the uID, and access the MF agent which may then spawn the MF process for performing the requested task.

One technical effect of the disclosure is that upon a request for data or actions from a client, the data source itself is accessed, rather than a data warehouse or another intermediary data source. This access provides for returning to the client an up-to-date response, in real-time or near real time.

Another technical effect of the disclosure is that the direct access eliminates the need to create and maintain intermediate data sources and move the information around, thereby saving the involved hardware, software and human labor. This also provides for returning the most complete responses, as all the data is available and not only the portions that have been copied to the data warehouse.

Yet another technical effect of the disclosure is that by using an AI engine, the engineers responsible for the applications do not have to learn the specific API of the MF system, and may use natural language to express the required information.

Yet another effect of the disclosure is that the AI agents may derive new insights upon the received data, without having to update the mainframe code or database schema. For example, an AI engine may assess citizen tax payments against recently issued government tax regulations, without having to adapt code on the MF to calculate the newly owed taxes, simply by accessing the raw payment data.

Referring now to FIG. 1, showing a schematic illustration of a traditional system for retrieving data from a database.

The system comprises MF system 108, having Database 116 stored therein or in an associated storage device. Database 116 may be any database compatible with a MF, such as but not limited to DB2, VSAM, MQ, IMS DB, or the like.

One or more client applications, such as Cloud Applications 104 may need to retrieve data from Database 116.

However, Database 116 is inaccessible to the user outside the organization, and a portion of the data is maintained in Data Warehouse 112. Data Warehouse 112 may be updated periodically, for example every hour, every day, or the like, with data that is assumed to be relevant to one or more users of cloud applications 104. The data may be transferred from Database 116 to Data Warehouse 112 using any relevant mainframe protocol, such as Extract, Transform, Load (ETL), Change Data Capture (CDC) or File Transfer Protocol (FTP).

Cloud applications 104 may be required to address Data Warehouse 112 using predefined APIs. Thus, not only that Cloud Applications 104 cannot access any data that is not replicated in Data Warehouse 112, they are also limited to the specific requests enabled by an API provided by Data Warehouse 112.

This embodiment carries an additional cost of creating a Data Warehouse 112, and periodically moving data from Database 116 to Data Warehouse 112.

Referring now to FIG. 2, showing a schematic illustration of a system for retrieving data from a database, in accordance with some exemplary embodiments of the disclosure.

In the system of FIG. 2, one or more cloud applications that need to access Database 116 may be an AI Agent 204, which may receive free text from a user, send a request directly to MF 108, and receive a response that is up-to-date, in accordance with the data stored at Database 116.

Agent 204 may send the request and receive the response in any standard Generative AI (GenAI) protocol, such as but not limited to Model Context Protocol (MCP), Agent2Agent (A2A) protocol, or the like.

Thus, Agent 204 may access MF system 108 rather than a partial temporary storage, thereby ensuring that the response is up-to-date with the latest information, and as full as possible.

However, this scheme is vulnerable to viruses, hacks, or other threats to the data in Database 116 or to the integrity of MF system 108.

Figure 4:
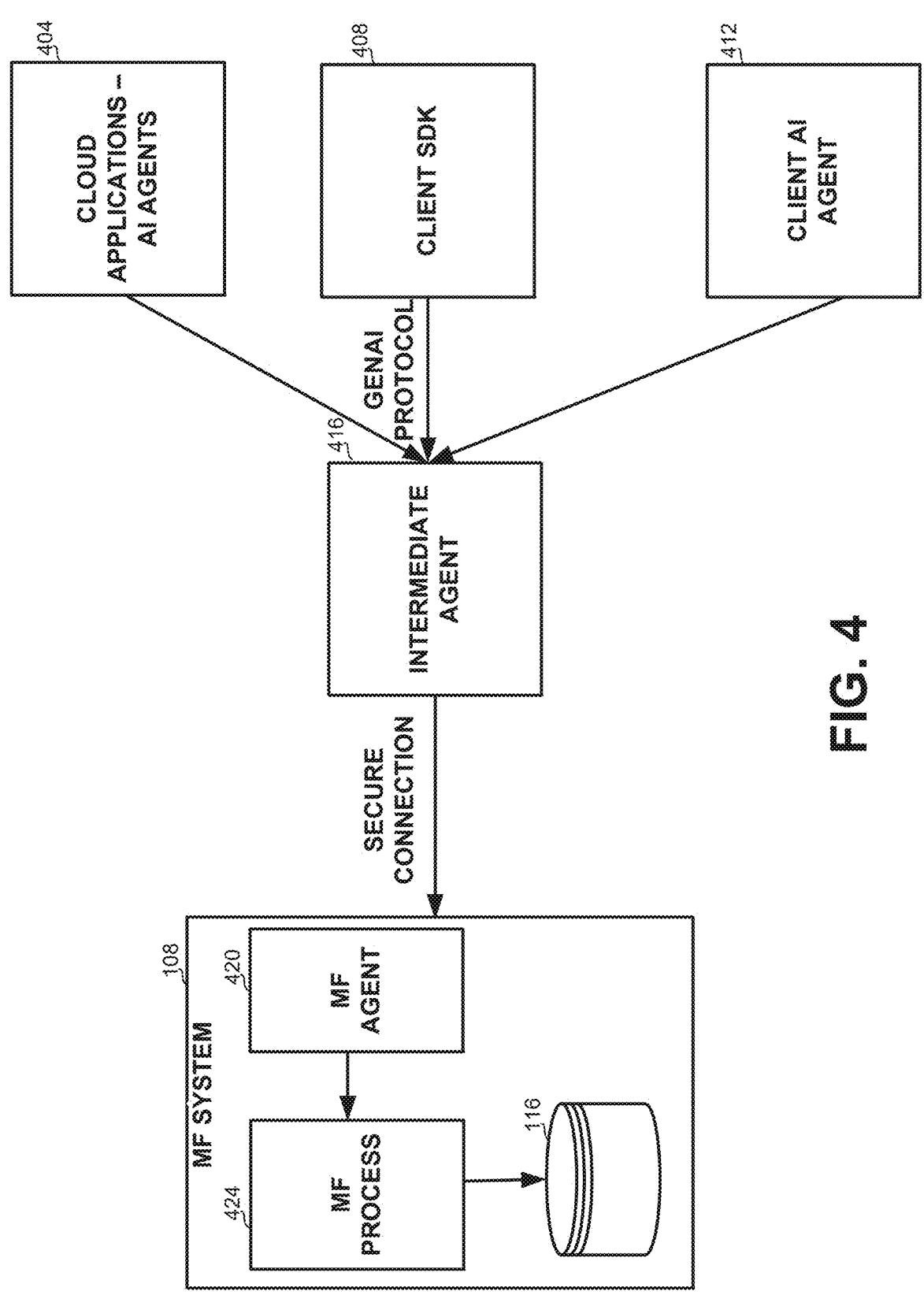
FIG. 4 is a block diagram of a computing platform implementing a system for connecting AI agents to main- frame data, in accordance with some exemplary embodi- ments of the disclosure.

Referring now to FIG. 3A, showing a flowchart of a method for connecting AI agents to mainframe data, and to FIG. 4, showing a block diagram of a computing platform implementing a corresponding system, in accordance with some exemplary embodiments of the disclosure.

The system may provide services to one or more clients, such as but not limited to one or more cloud applications, AI Agents 404, client System Development Kit (SDK) 408, client AI Agents 412, or the like, collectively referred to as "AI client". One or more of the AI clients may be implemented as Large Language Models (LLMs).

At step 304, Intermediate Agent 416 may receive from the AI client, a request for data or actions from MF System 108. The request may comprise a pre-generated token, wherein the token is associated with a uID of MF System 108, and wherein the user associated with the uID has a set of privileges within MF System 108. Intermediate Agent 416 may verify the integrity of the token and optionally its association with the user.

The AI client may send the request to Intermediate Agent 416, using for example the GenAI protocol.

At step 308, Intermediate Agent 416 may provide the request to MF Agent 420 executed by the MF System 108, wherein MF Agent 420 has a privilege to spawn an MF Process 424 associated with the uID. MF Agent 420 may be restricted from applicative privileges, such as accessing Database 116 or performing any actions, and its privileges may be limited to spawning MF Process 424. MF Process 424 may be restricted from administrative privileges such as spawning processes, and may be limited to accessing Database 116 or performing actions, all in accordance with and not exceeding the privileges of the user associated with the uID.

Intermediate Agent 416 may provide the request to MF Agent 420 using any secure connection acceptable by the organization, for example, over HTTPS or other SSL/TLS encrypted TCP/IP protocol.

At step 312, MF Agent 420 may spawn MF Process 424, which is also executed by MF System 108, wherein MF Process 424 has the set of privileges that is associated with the uID or a portion thereof, such that MF process 424 can execute the request.

At step 316, the request may be provided by MF Agent 420 to MF Process 424, for execution. MF Process 424 may have the relevant privileges of the user associated with the uID and may thus execute the request, and generate a response.

At step 320, MF Agent 420 may receive the response from MF Process 424.

At step 324, MF Agent 420 may send the response to Intermediate Agent 416, which may then send the response to the AI client.

Referring now to FIG. 3B, showing a flowchart of a method for generating a token, in accordance with some exemplary embodiments of the disclosure At step 340, Intermediate Agent 416 may receive from the AI client a request to generate a token for accessing MF System 108. The request may comprise uID of a user of MF System.

At step 344, Intermediate Agent 416 may send to the AI client a request for providing a password corresponding to the uID within MF System 108.

At step 348, Intermediate Agent 416 may receive the password from the AI client.

At step 352, Intermediate Agent 416 may send the uID and the password to MF System 108 for verification.

At step 356, subject to receiving from MF System 108 a verification that the password corresponds to the uID, a token may be generated, and sent to the AI client for future use.

In some embodiments, the token may expire after a predetermined period of time, such as one week, one month, or the like, or after a predetermined number of requests, or a combination thereof. The AI client may then try to request another token, and if all integrity conditions are met a new token will be generated as above.

Figure 5:
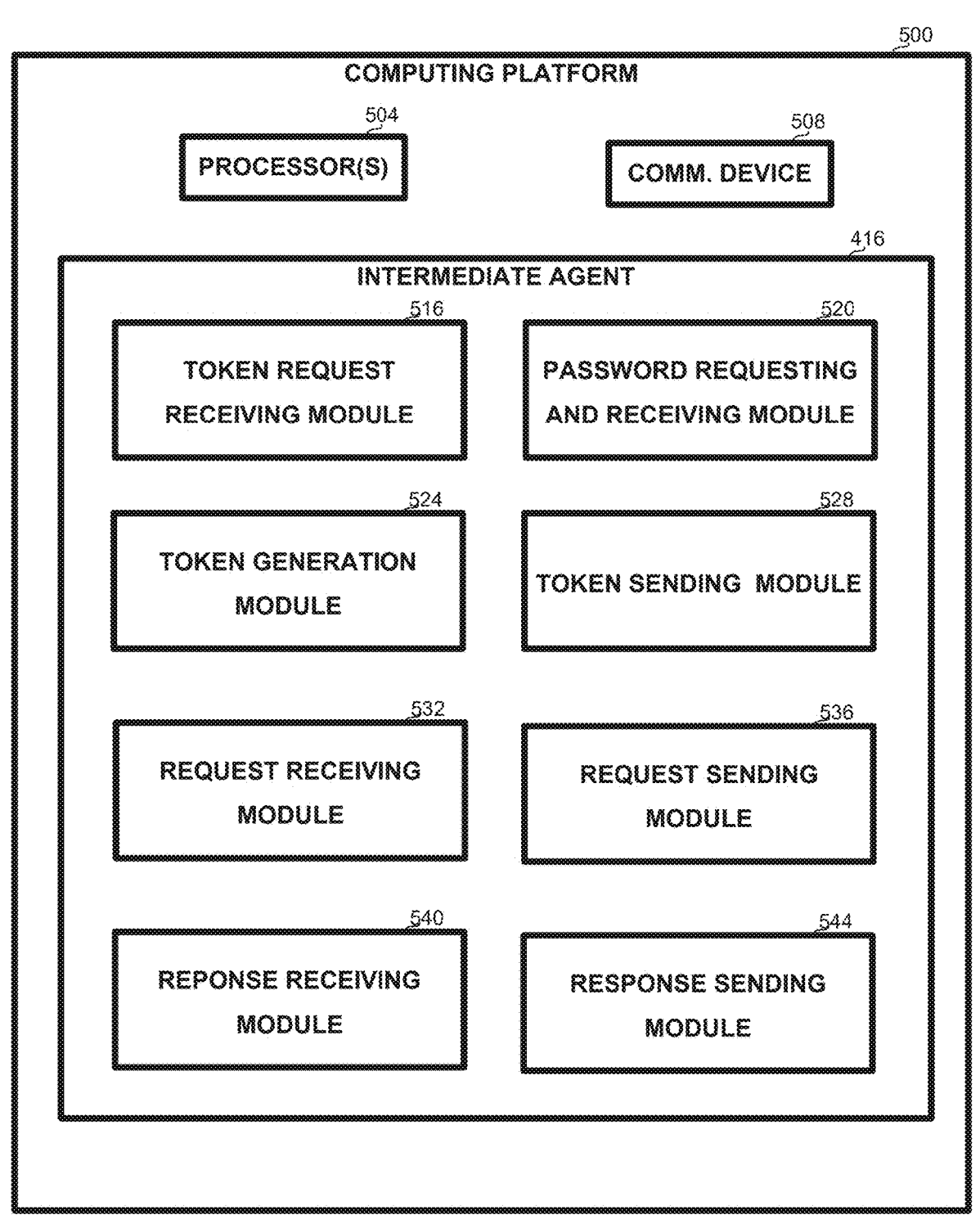
FIG. 5 is a block diagram of a computing platform executing an intermediate agent, in accordance with some exemplary embodiments of the subject matter.

Referring now to FIG. 5, showing a block diagram of a computing platform executing an intermediate agent, in accordance with some exemplary embodiments of the subject matter.

Computing Platform 500 may be implemented as a server, a cloud server, or any other computing platform. It is appreciated that the computing platform may be positioned anywhere and can also serve additional purposes.

Computing Platform 500 may comprise one or more Processors 504 located on the same computing platform or not, which may be one or more Central Processing Units (CPU), microprocessors, electronic circuits, Integrated Circuits (IC) or the like. Processor 504 may be configured to provide the required functionality, for example by loading to memory and activating the software modules stored with Intermediate Agent 416 detailed below.

Computing Platform 500 may comprise a Communication Device 508 for communicating with other devices or other computing platforms, for example communicating with any AI client, MF system 108, or the like. Communication Device 508 may be adapted to interface with any communication channel such as Local Area Network (LAN), Wide Area Network (WAN), cellular network or the like, and use any relevant communication protocol.

Computing Platform 500 may comprise Intermediate Agent 416, which may be stored on a storage device, such as a hard disk drive, a Flash disk, a Random Access Memory (RAM), a memory chip, or the like. In some exemplary embodiments, Intermediate Agent 416 may retain program code operative to cause Processor 504 to perform acts associated with any of the modules listed below, or steps of the methods of FIGS. 3A and 3B above. The program code may comprise one or more executable units, such as functions, libraries, standalone programs or the like, adapted to execute instructions as detailed below.

Intermediate Agent 416 may retain Token Request Receiving Module 516, for receiving a request for a token from any AI client. Token Request Receiving Module 516 may check for the indication of an accessible MF system and a uID within the request.

Intermediate Agent 416 may retain Password Requesting And Receiving Module 520, for requesting from the AI client a password corresponding to the uID, and receiving the password, for example under a secured protocol.

Intermediate Agent 416 may retain Token Generation Module 524, for verifying with the indicated MF system whether the password corresponds to the uID, and subject to such verification, generating the token. The token may be, for example, a code comprising 32 or any number of hexadecimal digits.

Intermediate Agent 416 may retain Token Sending Module 528, for sending the generated token to the AI client. For security, the token may be sent without the uID, encrypted, or the like.

Intermediate Agent 416 may retain Request Receiving Module 532, for receiving a request for data or actions from any AI client. Request Receiving Module 532 may verify the integrity and validity of the token.

Intermediate Agent 416 may retain Request Sending Module 536, for sending the request for data or actions to the MF system. The request may comprise the uID corresponding to the token. It may be verified by MF System 108 that the privileges necessary for completing the request are contained in the privileges associated with the uID.

Intermediate Agent 416 may retain Response Receiving Module 540, for receiving a response from MF System 108.

Intermediate Agent 416 may retain Response Sending Module 544, for sending the response to Intermediate Agent 416.

Intermediate Agent 416 may further comprise data, such as generated tokens, the associated uIDs, the MF systems each token is associated with, or the like.

It is appreciated that the disclosure is not limited to AI clients, or to communication using GenAI protocol such as MCP, A2A or others.

Rather, the disclosure is equally applicable to any client requiring information from an MF system, or wishing to perform actions with an MF system. By using an intermediate agent, and an MF agent that spawns an MF process, security issues are handled by the MF system, according to the implemented standard and methods, and is thus as strict as any other.

Thus, any application, and in particular non-AI application, may use APIs which may be supported by the intermediate agent, and implemented, for example, as a Python SDK, to access mainframe data sources. When invoking the APIs, a non-AI calling application will have to supply a token for identification, wherein the token is obtained and maintained as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for securing access to mainframe (MF) data from an Artificial Intelligence (AI) client, the method comprising:

receiving, by an intermediate agent, from the AI client, a request for data or actions from a mainframe (MF) system, the request comprising a token, the token was previously generated, the token is associated with a user identifier (uID) of the MF system, wherein the uID is associated with a set of privileges within the MF system;

providing by the intermediate agent the request to an MF agent executed by the MF system, wherein the MF agent has a privilege to spawn an MF process associated with the uID, wherein the MF agent is restricted from accessing data or performing actions other than spawning the MF process; and spawning, by the MF agent, the MF process, the MF process is executed by the MF system, wherein the MF process has the set of privileges that is associated with the uID, wherein the MF process is restricted from spawning another process, thereby implementing secure access to the MF system, wherein the token is generated by:

receiving by the intermediate agent from a client a request to generate the token for accessing the MF system, the request comprising the uID of the MF system and the set of privileges or a portion thereof;

sending by the intermediate agent a request to the AI client for a password associated with the uID of the MF system;

receiving by the intermediate agent the password from the AI client;

sending the by the intermediate agent uID and the password to the MF system for verification; and subject to receiving by the intermediate agent from the MF system a verification that the password corresponds to the uID, generating the token.

2. The method of claim 1, further comprising:

providing by the MF agent the request to the MF process;

receiving by the MF agent a response to the request; and providing by the MF agent the response to the intermediate agent.

3. The method of claim 1, wherein the intermediate agent is configured to receive the request through a generative Artificial Intelligence (genAI) protocol.

4. The method of claim 3, wherein the genAI protocol is Model Context Protocol (MCP).

5. The method of claim 1, wherein the AI client is implemented using a Large Language Model (LLM).

6. A system for securing access to MF data from an LLM or an AI client, the system comprising: a hardware processor and a memory;

an intermediate agent configured to:

receive from the AI client, a request for data or actions from an MF system, the request comprising a token, the token was previously generated, the token is associated with a uID of the MF system, wherein the uID is associated with a set of privileges within the MF system; and provide the request to an MF agent executed by the MF system, wherein the MF agent has a privilege to spawn an MF process associated with the uID, wherein the MF agent is restricted from accessing data or performing actions other than spawning the MF process; and an MF agent configured to: upon receiving the request from the intermediate agent, spawning an MF process, the MF process is executed by the MF system, wherein the MF process has the set of privileges that is associated with the uID, wherein the MF process is restricted from spawning another process, thereby implementing secure access to the MF system, wherein the intermediate agent is further configured to:

receive from a client a request to generate the token for accessing the MF system, the request comprising the uID of the MF system and the set of privileges or a portion thereof;

send a request to the AI client for a password associated with the uID of the MF system;

receive the password from the AI client;

send the uID and the password to the MF system for verification; and generate the token subject to receiving from the MF system a verification that the password corresponds to the uID.

7. The system of claim 6, wherein the MF agent is further configured to:

provide the request to the MF process;

receive a response to the request; and provide the response to the intermediate agent.

8. The system of claim 6, wherein the intermediate agent is configured to receive the request through a genAI protocol.

9. The system of claim 8, wherein the genAI protocol is MCP.

10. The system of claim 6, wherein the AI client is implemented using an LLM.

11. A computer program product comprising a non-transitory computer readable storage medium retaining program instructions for securing access to MF data from an LLM or an AI client, the program instructions comprise:

receiving, by an intermediate agent, from an AI client, a request for data or actions from an MF system, the request comprising a token, the token was previously generated, the token is associated with a uID of the MF system, wherein the uID is associated with a set of privileges within the MF system;

providing by the intermediate agent the request to an MF agent executed by the MF system, wherein the MF agent has a privilege to spawn an MF process associated with the uID, wherein the MF agent is restricted from accessing data or performing actions other than spawning the MF process; and spawning, by the MF agent, the MF process, the MF process is executed by the MF system, wherein the MF process has the set of privileges that is associated with the uID, wherein the MF process is restricted from spawning another process, thereby implementing secure access to the MF system, wherein the token is generated by:

receiving by the intermediate agent from a client a request to generate the token for accessing the MF system, the request comprising the uID of the MF system and the set of privileges or a portion thereof;

sending by the intermediate agent a request to the AI client for a password associated with the uID of the MF system;

receiving by the intermediate agent the password from the AI client;

sending the by the intermediate agent uID and the password to the MF system for verification; and subject to receiving by the intermediate agent from the MF system a verification that the password corresponds to the uID, generating the token.

12. The computer program product of claim 11, wherein the program instructions further comprise:

providing by the MF agent the request to the MF process;

receiving by the MF agent a response to the request; and providing by the MF agent the response to the intermediate agent.

13. The computer program product of claim 11, wherein the intermediate agent is configured to receive the request through a genAI protocol.

14. The computer program product of claim 13, wherein the genAI protocol is MCP.

15. The computer program product of claim 11, wherein the AI client is implemented using an LLM.

* * * * *